US009923951B2

(12) United States Patent
Dimov

(10) Patent No.: US 9,923,951 B2
(45) Date of Patent: Mar. 20, 2018

(54) PLACESHIFTING RECOMMENDATIONS USING GEOLOCATION AND RELATED SYSTEMS AND METHODS

(71) Applicant: SLING MEDIA INC., Foster City, CA (US)

(72) Inventor: Dmitry Dimov, San Francisco, CA (US)

(73) Assignee: SLING MEDIA L.L.C., Foster City, CA (US)

( * ) Notice: Subject to any disclaimer, the term of this patent is extended or adjusted under 35 U.S.C. 154(b) by 383 days.

(21) Appl. No.: 14/225,799

(22) Filed: Mar. 26, 2014

(65) Prior Publication Data

US 2015/0281329 A1    Oct. 1, 2015

(51) Int. Cl.
*H04L 29/06* (2006.01)
*H04L 29/08* (2006.01)

(52) U.S. Cl.
CPC .......... *H04L 67/10* (2013.01); *H04L 65/1083* (2013.01); *H04L 65/4069* (2013.01); *H04L 65/4076* (2013.01); *H04L 67/104* (2013.01); *H04L 67/1097* (2013.01); *H04L 67/125* (2013.01); *H04L 67/18* (2013.01); *H04L 67/42* (2013.01)

(58) Field of Classification Search
CPC . H04L 67/10; H04L 65/1083; H04L 65/4076; H04L 65/4069
See application file for complete search history.

(56) References Cited

U.S. PATENT DOCUMENTS

| 6,647,389 | B1 * | 11/2003 | Fitch | H04H 20/12 |
|---|---|---|---|---|
| 9,264,771 | B1 * | 2/2016 | Oztaskent | H04N 21/44227 |
| 2005/0177844 | A1 * | 8/2005 | Levi | G06Q 30/02 725/30 |
| 2006/0095471 | A1 * | 5/2006 | Krikorian | H04N 21/4398 |
| 2008/0134043 | A1 * | 6/2008 | Georgis | G06F 17/30035 715/733 |
| 2008/0195664 | A1 * | 8/2008 | Maharajh | G06F 17/30035 |
| 2010/0057739 | A1 * | 3/2010 | Charka | G06F 17/30876 707/E17.001 |
| 2010/0082567 | A1 * | 4/2010 | Rosenblatt | G06F 17/30017 707/705 |
| 2010/0197236 | A1 * | 8/2010 | Kawamura | H04L 29/12028 455/67.7 |
| 2010/0269138 | A1 * | 10/2010 | Krikorian | H04N 21/23406 725/39 |
| 2011/0055864 | A1 * | 3/2011 | Shah | H04N 7/1675 725/31 |
| 2011/0099571 | A1 * | 4/2011 | Lucas | H04N 21/40 725/19 |

(Continued)

*Primary Examiner* — Dustin Nguyen
*Assistant Examiner* — Javier O Guzman
(74) *Attorney, Agent, or Firm* — Lorenz & Kopf, LLP

(57) ABSTRACT

Methods and systems are provided for placeshifting data. An exemplary method of placeshifting a media program from a source device to a destination device over a network involves obtaining location information associated with the destination device, determining, by a server coupled to the network, one or more recommended media programs available for streaming from the source device in a manner that is influenced by the location information, and providing indication of the one or more recommended media programs to the destination device.

18 Claims, 6 Drawing Sheets

(56) References Cited

U.S. PATENT DOCUMENTS

| | | | |
|---|---|---|---|
| 2011/0281538 A1* | 11/2011 | Morrison | H04H 60/46 455/185.1 |
| 2011/0320450 A1* | 12/2011 | Liu | G06F 17/30876 707/737 |
| 2012/0093482 A1* | 4/2012 | Wei | H04N 21/44016 386/241 |
| 2014/0165118 A1* | 6/2014 | Garcia Mendoza | H04L 65/605 725/90 |
| 2014/0215506 A1* | 7/2014 | Kalmes | H04N 21/25841 725/14 |
| 2014/0359140 A1* | 12/2014 | Shankarraman | H04L 65/1069 709/227 |

\* cited by examiner

PLACESHIFTING RECOMMENDATIONS USING GEOLOCATION AND RELATED SYSTEMS AND METHODS

TECHNICAL FIELD

The following description generally relates to recommending media content for placeshifting from one device for viewing on another device.

BACKGROUND

Media content can now be received from any number of different sources and stored in a personal or digital video recorder (DVR) or the like for viewing at a later time ("time shifting"). Live or recorded media content can also be "placeshifted" to allow viewing at remote locations away from the viewer's primary television set. Due to the proliferation of portable consumer electronic devices with display and network communication capabilities, viewers have more opportunities to placeshift content. Often, users like to be apprised of available media content that is likely to be of interest to them, which alleviates the burden on a user to manually search and locate content. Accordingly, it is now desirable to provide a more satisfactory user experience by creating systems and methods for recommending (or suggesting) media content available for placeshifting that is increasingly likely to be relevant or otherwise of interest to users. Other desirable features and characteristics may also become apparent from the subsequent detailed description and the appended claims, taken in conjunction with the accompanying drawings and this background section.

BRIEF SUMMARY

According to various exemplary embodiments, methods, systems, and devices are provided for transmitting data from a source device to a destination device. One exemplary method of placeshifting a media program from a source device to a destination device over a network involves obtaining location information associated with the destination device and a server coupled to the network determining one or more recommended media programs available for streaming from the source device in a manner that is influenced by the location information and providing indication of the one or more recommended media programs to the destination device.

In other embodiments, a media system is provided. The system includes a media device coupled to a network and a server coupled to the network. The server is configured to obtain location information associated with a client device coupled to the network, determine one or more recommended media programs available for streaming from the media device to the client device over the network based at least in part on the location information, and provide indication of the one or more recommended media programs to the client device.

In another embodiment, a method of placeshifting a media program from a media device to a client device over a network involves identifying a client location of the client device, identifying a home location of the media device, and determining one or more recommended broadcast media programs from among a plurality of broadcast media programs available at the media device based at least in part on the client location relative to the home location. The method continues by a server coupled to the network providing indication of the one or more recommended broadcast media programs to the client device, receiving indication of a selected broadcast media program of the one or more recommended broadcast media programs from the client device, providing streaming instructions for the selected broadcast media program to the media device. The media device initiates a placeshifting session for streaming the selected broadcast media program from the media device to the client device over the network in response to the streaming instructions.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of a system for placeshifting content from a source device to a destination device in accordance with one or more embodiments;

Figure 6:
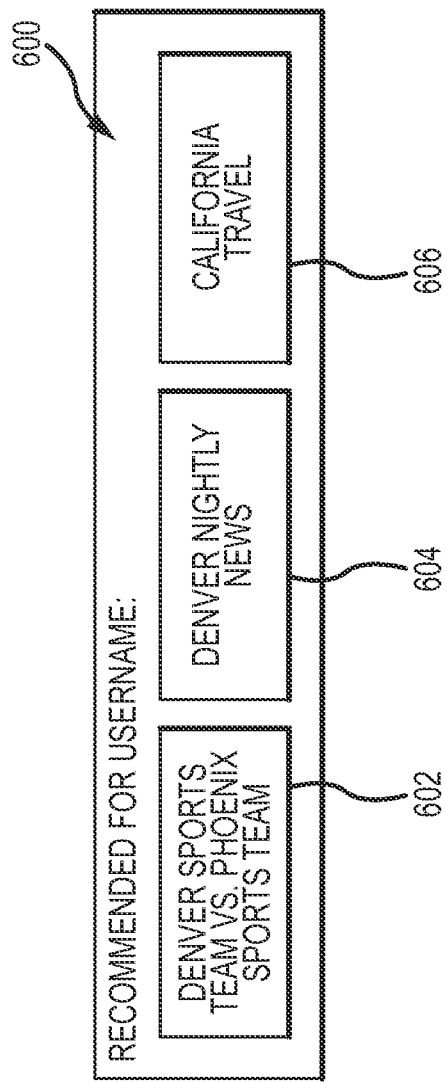
Figure 7:
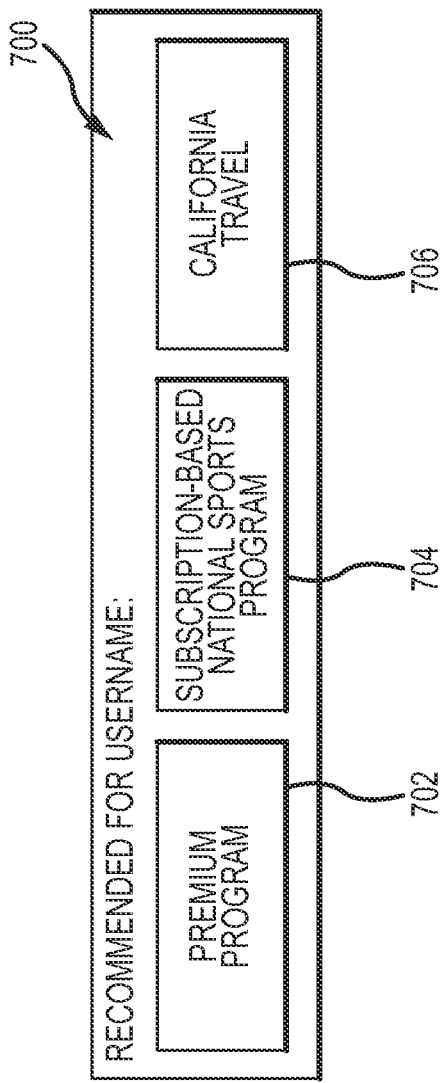

FIG. 6 depicts an exemplary graphical user interface identifying recommended media content in accordance with one exemplary embodiment where the destination device is outside of the designated market area associated with the source device; and FIG. 7 depicts another exemplary graphical user interface identifying recommended media content in accordance with one exemplary embodiment where the destination device is within the designated market area associated with the source device.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to recommending (or suggesting) instances of content for a placeshifting session in a manner that takes into account the location of the destination device for the placeshifting relative to the source device. For purpose of explanation, the subject matter may be described herein in the context of placeshifting media content among networked devices within a media system. However, it will be appreciated that the subject matter described herein is not necessarily limited to any particular type of content for the data being placeshifted. As used herein, "media content," "media program," or variants thereof should be understood as referring to any audio, video, audio/visual or other programming in any streaming, file-based or other format. For purposes of explanation, the subject matter may be described herein in the context of recommending media programs currently being broadcast or otherwise provided by a broadcast content source for placeshifting substantially in real-time (or live streaming), however, the subject matter described herein is not limited to any particular type of media program being recommended and/or placeshifted or any particular type of content source. For example, in some embodiments, recorded or stored media programs may be recommended for placeshifting in addition to and/or in alternative to broadcast media programs.

In exemplary embodiments, location information is obtained for the destination device and the source device, and one or more media programs are identified as recommended (or suggested) for the user of the destination device based on the destination device's location relative to the source device's location. For example, in one or more embodiments, the recommendation algorithm(s) used to calculate or otherwise determine a metric for the relevance or likelihood of the user being interested in a particular media program take into account the destination device's location relative to the source device's location when determining the metric. Thus, the destination device's location relative to the source device's location may influence or otherwise adjust the value of the recommendation metric for a particular media program, which, in turn, results in that media program either being more highly recommended or not recommended when the destination device is at a particular location relative to the media device.

In some embodiments, the unavailability (or likely unavailability) of a media program at the destination device may also be utilized to identify recommended media programs for the user of the destination device. For example, when the destination device is located within a designated market area that is different from the designated market area associated with the source device, media programs that are exclusively available within the source device's designated market area and/or media programs that are unavailable within the destination device's designated market area may be more highly recommended than they would otherwise be if the destination device were within the same designated market area as the source device. Additionally, the viewing behavior of the user may be stored or otherwise maintained in association with the location of the destination device to facilitate establishing a correlation or relationship between the location of the destination device relative to the media device and the particular media programs (or the types, categories, or genres thereof) that are more or less likely to be relevant (or interesting) to the user when the destination device is at that location relative to the media device.

Figure 1:
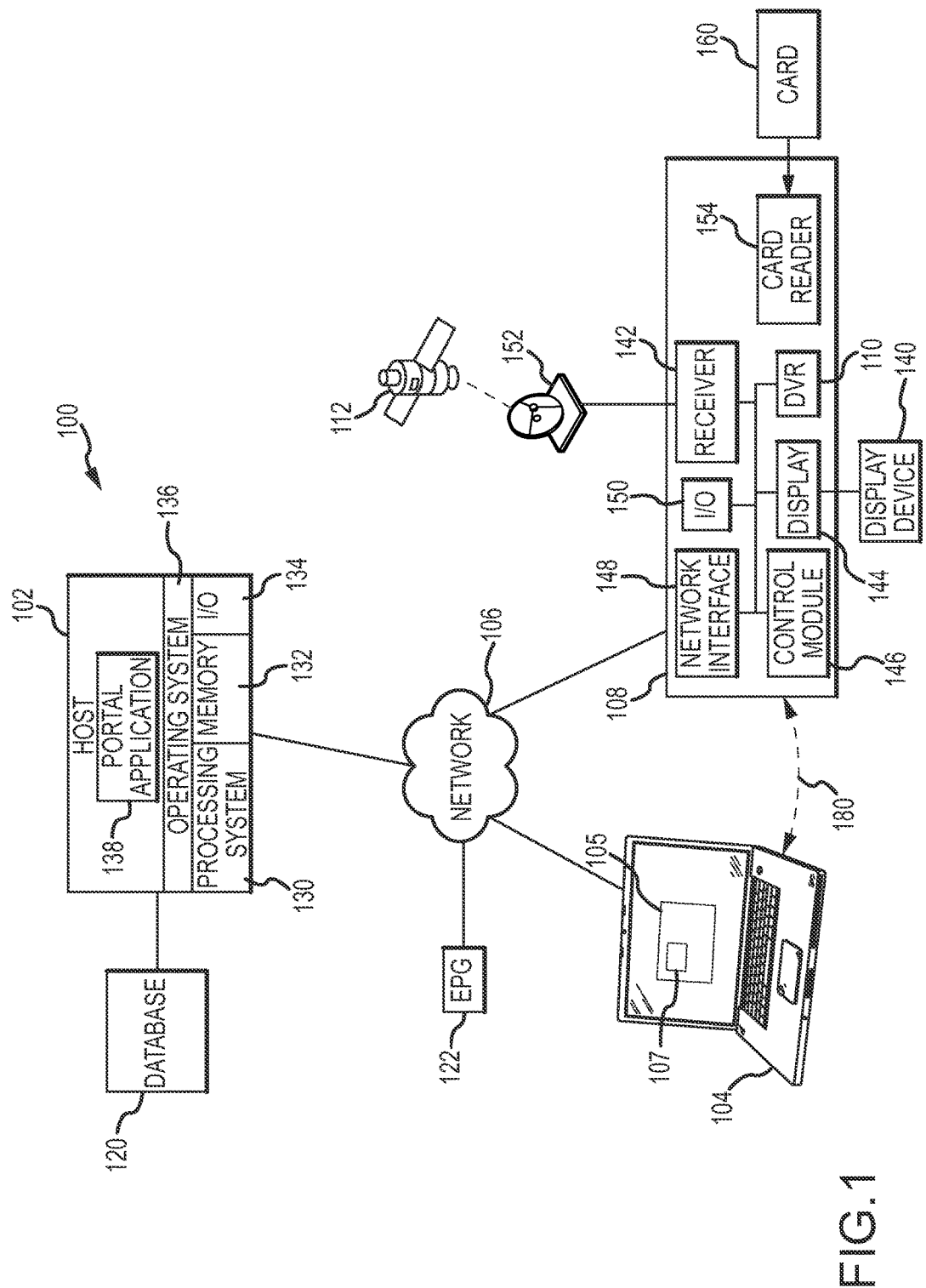

FIG. 1 depicts an exemplary embodiment of a system 100 for placeshifting or otherwise transferring data or content, such as a media program (or media content), over a network 106 from a source electronic device 108 to a destination electronic device 104 for presentation to a user (or viewer) on the destination electronic device 104. For purposes of explanation, but without limitation, the source device 108 may be alternatively referred to herein as a media device or a placeshifting device, and the destination electronic device 104 may be alternatively referred to herein as a playback device or a client device (or client). The placeshifting system 100 also includes a host server 102 (or host) that communicates or otherwise interacts with the devices 104, 108 over the network 106 to facilitate establishment of a peer-to-peer connection 180 over the network 106, where the peer-to-pee connection 180 is then utilized for a placeshifting session, as described in greater detail below.

In exemplary embodiments, the server 102 obtains location information associated with the client device 104, where the location information is indicative of the geographic location of the client device 104 relative to the media device 108. Based at least in part on the location information, the server 102 identifies or otherwise determines one or more recommended (or suggested) media programs available for streaming from the media device 108 to the client device 104 over the network 106 via the peer-to-peer connection 180 that are likely to be relevant or interesting to the user of the client device 104. In this manner, the recommended media programs are influenced by the geographic location of the client device 104. In various embodiments, the server 102 also obtains location information associated with the media device 108 and determines the recommended media programs in a manner that is influenced by both the geographic location of the media device 108 and the geographic location of the client device 104.

The client device 104 may be any device, component, module, hardware and/or the like that is capable of communicating with the server 102 over network 106. For example, depending on the embodiment, client device 104 may be realized as a conventional personal computer, portable computer, workstation and/or other computing system, a mobile (or cellular) telephone, a personal digital assistant, a video game player, a network appliance, a remote control, a networked display and/or any other device capable of receiving media programs via the network 106 and rendering audio and/or visual content. The client device 104 may include a processing system and a data storage element (or memory) that is coupled to or otherwise accessed by the processing system and stores programming instructions that, when read and executed, cause the processing system of the client device 104 to perform various tasks, functions, processes and/or operations and support the subject matter described herein. In exemplary embodiments described herein, the client 104 resides at a geographic location that is remote or otherwise physically distinct from the geographic location of the media device 108. In this regard, the media device 108 may have an essentially fixed or permanent geographic location, whereas the geographic location of the client 104 is transient or otherwise variable with respect to the location of the media device 108. For example, the media device 108 may be realized as a set-top box or a similar device that resides at a user's home for providing media content to the user's television or other home display device 140, while the client 104 is realized as a portable electronic device, such as a mobile phone or other mobile computing device, that moves about with the user.

In the embodiment shown in FIG. 1, client device 104 executes any sort of client application 105 that is compatible with standard Internet, world wide web (WWW), transmission control protocol and/or internet protocol (TCP/IP), and/or other formats. In some embodiments, the client application 105 is realized as a mobile application that is compatible with cellular and/or other mobile formats. In other embodiments, the client application 105 may be realized as a web browser capable of displaying active or other documents formatted in accordance with published protocols (e.g., hypertext markup language (HTML), extensible markup language (XML), and/or the like). The client application 105 may also be capable of executing "plugin" applications, applets or the like. Such plugins may be formatted in accordance with ActiveX, JAVA and/or any number of other formats. It will be appreciated that the format of the client application 105 may vary depending on the type of client device 104 (or the operating system and/or computing platform associated therewith), and the subject matter described herein is not limited to any particular type of client application 105. In the illustrated embodiment, client 104 further includes a media player application 107. This media player 107 may be a standalone player, or the media player 107 may be implemented as a plugin or other applet that runs within client application 105 as desired. In some embodiments, media player 107 is initially obtained from a networked host, such as server 102. The media player 107 may be retrieved on an as-needed basis in some embodiments, or may be stored at client 104 for subsequent execution.

Still referring to FIG. 1, in exemplary embodiments, the media device 108 is any device, module, component, hardware and/or the like capable of receiving and processing media content from one or more content sources. For example, in some embodiments, media device 108 is a set-top box (STB) or similar system that is able to receive television programming and/or to record certain programs that can be viewed on a display device 140, such as a television, monitor, liquid crystal display (LCD), light emitting diode (LED) display, plasma display, or the like. Exemplary embodiments of media device 108 will therefore include or otherwise be coupled to a receiver interface 142 for receiving satellite, cable and/or broadcast programming signals from broadcast sources 112, as well as a data storage medium 110 (e.g., a hard disk, flash memory, or another suitable non-volatile data storage element) to support a digital video recorder (DVR) feature and/or functionality, a display interface 144 for providing imagery to the display device 140, and a control module 146 that directs the operations of the media device 108 as appropriate. For convenience, but without limitation, the data storage medium 110 is alternatively referred to herein as a DVR. Media device 108 may also include one or more interfaces 148 to the network 106 and/or an input/output interface 150 to a remote control or other device for providing user inputs to the media device 108, as appropriate. For example, the network interface(s) 148 of the media device 108 may include an interface or port for a wired communications layer (e.g., an Ethernet port or adapter), an interface for a wireless communications layer (e.g., an IEEE 802.11-compatible transceiver), and/or the like.

The components in media device 108 may be provided within a common chassis or housing as shown in FIG. 1, although equivalent embodiments may implement media device 108 with any number of inter-connected but discrete components or systems. For example, in some embodiments, the media device 108 may be realized as a combination of a STB and a placeshifting device, wherein some features of the media device 108 (e.g., the DVR 110, the receiver 142, the display interface 144, and/or I/Os 150) are implemented by the STB and other features of the media device 108 (e.g., the network interface 148) are implemented by the placeshifting device, wherein the placeshifting device works in conjunction with the STB to shift the viewing experience from a home television (e.g., display device 140) to a viewing display on the client device 104 (e.g., media player application 107) that is accessed via the network 106. Examples of placeshifting devices that may be used in some embodiments of media device 108 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 108 may be a hybrid DVR and/or receiver, for example, that also provides transcoding and placeshifting features. It should be appreciated that FIG. 1 depicts merely one exemplary embodiment of a media device 108, and in practice, the media device 108 may be logically and physically implemented in any manner to suit the needs of a particular embodiment.

In the exemplary embodiment illustrated in FIG. 1, media device 108 is capable of receiving digital broadcast satellite (DBS) signals transmitted from a broadcast source 112, such as a satellite, using an antenna 152 that provides received signals to the receiver 142. Equivalent embodiments, however, could receive programming at receiver 142 from any sort of cable connection, broadcast source, removable media, network service, external device and/or the like. In some embodiments, the media device 108 may also include an access card interface or card reader 154 adapted to receive an access card 160 (or viewing card) configured to ensure that the viewer is authorized to view media content provided to the primary display device 140. In this regard, the access card 160 includes unique identification information associated with a particular subscriber to the broadcast content source 112 or otherwise includes subscription information that facilitates receiving and/or decoding media content provided by the broadcast content source 112.

The DVR 110 feature stores recorded programming (e.g., broadcast programming received via receiver 142) on a hard disk drive, memory, a networked server, or other storage medium as appropriate in response to user/viewer programming instructions, wherein the recorded programming may be subsequently viewed on display device 140 or client device 104 via network 106. Content stored in DVR 110 may be any sort of file-based programming or other content that is accessible to media device 108. In various embodiments, in addition to storing broadcast programming, the DVR 110 may also store programming received from other sources not illustrated in FIG. 1, such as, for example, programming downloaded from an on-demand programming source or an online programming source. Additionally, content in DVR 110 may be stored in any sort of compressed or uncompressed format, as desired, and may be encoded or transcoded as desired for effective receipt, storage, retrieval and playing.

The control module 146 is any sort of hardware, circuitry, processing logic and/or other components capable of directing the operations of media device 108. In various embodiments, control module 146 includes software or firmware logic and/or other programming instructions residing in memory and executing on any sort of processing system, such as any sort of processor, microprocessor, microcontroller, digital signal processor or the like. The instructions, when read and executed, cause the control module 146 to perform various tasks, functions, processes and/or operations and otherwise support the subject matter described herein. In various embodiments, the control module 146 is based upon a "system on a chip" (SoC) implementation that incorporates a hybrid microcontroller with memory, input/output and other features to perform the various signal processing and other actions of media device 108. Other embodiments may implement control module 146 and/or the other features of media device 108 with any number of discrete and/or integrated processing components (e.g., any sort of microprocessor or microcontroller), memories, input/ output features and/or other features as desired. The control module 146 communicates with the network interface 148 to establish a peer-to-peer connection 180 to the client device 104 over the network 106 and support streaming of media programs (e.g., from the DVR 110 or the receiver 142) to the client device 104 over the network 106 via the peer-to-peer connection 180, as described in greater detail below.

In the embodiment of FIG. 1, the network 106 is any communications network (or a combination of communications networks) capable of transmitting data between devices within the system 100. In various embodiments, network 106 includes any number of public or private data connections, links or networks supporting any number of communications protocols. Network 106 may include the Internet, for example, or any other network. Such networks may be based upon TCP/IP or other conventional protocols, although other embodiments may use any type of alternate or successor protocols, as desired. In various embodiments, network 106 may also incorporate a wireless and/or wired telephone network, such as a cellular communications network for communicating with mobile phones, personal digital assistants, and/or the like. Various embodiments of network 106 may also incorporate any sort of wireless or wired local area networks (LANs), wide area networks (WAN), or the like.

In the illustrated embodiment of FIG. 1, the server 102 may be realized as one or more server computers or other device(s) coupled to the network 106 and capable of interacting with the devices 104, 108 to facilitate communications between the client device 104 and the media device 108 associated with the user or operator of the client 104. The server 102 may be implemented with a server computer system or data processing system that is based upon any processor, architecture and/or operating system, and will typically be implemented using any sort of processing system 130, memory 132 and input/output features 134. Various embodiments may be implemented using dedicated or shared hardware servers; other implementations may make use of virtual server features as part of a "cloud computing" service, such as any of the cloud computing services provided by any number of providers. Although FIG. 1 shows a single server 102 for convenience, many practical embodiments of the system 100 may provide a cluster or other collection of multiple host servers 102 to support any desired number of simultaneous communications with multiple clients 104 and/or multiple media devices 108. This cluster may also incorporate appropriate routing, load balancing, access and security mechanisms and or any number of other features. In various embodiments, each server 102 is an actual or virtual computer system executing an operating system 136 in conjunction with the processing system 130, memory 132 and/or I/O features 134 to provide a computing core that is capable of executing a portal application 138, as well as any number of daemons, processes, applications or other instance modules as desired. For example, a portal application 138 could execute as a daemon on the server 102, with connections to separate clients 104 being managed as separate processes or instances that communicate with portal application 138 using features provided by operating system 136. In one or more embodiments, the memory 132 stores programming instructions that, when read and executed, cause the processing system 130 to create, generate, or otherwise facilitate the portal application 138 and perform various tasks, functions, processes and/or operations described herein. In this regard, the memory 132 represents any non-transitory short or long term data storage element or other computer-readable media capable of storing programming instructions for execution by or on the processing system 130.

In one or more embodiments, the server 102 is coupled to a database 120 that stores or otherwise maintains information associated with the user of the client device 104, such as, for example, a user identifier, a street address associated with the user (e.g., the user's home address or another address where the user's associated media device 108 resides), personal information for the user (e.g., the user's age, gender, etc.), user preferences (e.g., the user's favorite or preferred categories of media content, the user's favorite or highly rated media programs, etc.), and the like. The database 120 may also store or otherwise maintain viewing information associated with the user, such as, for example, information identifying media programs previously viewed by the user via the media device 108 (e.g., a viewing history), metadata associated with the media programs previously viewed by the user, and viewing parameters for the previously viewed media programs (e.g., the frequency and/or duration of viewing). Additionally, for previously viewed media programs that were placeshifted from the media device 108 to the client device 104, the viewing information may also include information indicative of the geographic location of the client device 104 during the placeshifting or otherwise at the time of the placeshifting. Using the information associated with the user of the client device 104 in the database 120, the server 102 identifies or otherwise determines recommended media programs for streaming from the media device 108 to the client 104 when the user of the client 104 accesses the portal application 138 and presents or otherwise provides those recommended media programs on the client 104 (e.g., within the client application 105), as described in greater detail below. In this regard, the recommended media programs are a subset of the media programs available for viewing via the media device 108 that are most likely to be of interest to the user of the client 104 based on the user's preferences, personal information, viewing history, and the like.

In exemplary embodiments, the server 102 is coupled to an electronic program guide 122, which may be realized as a server, a database, or another device operating on the network 106 that maintains information pertaining to current and/or future broadcasts (or airings) of media programs that are available to be received from broadcast source 112 (e.g., by the media device 108 via receiver 142 and/or antenna 152). In some embodiments, to determine recommended media programs from among the currently available broadcast media programs identified via the program guide 122, the server 102 and/or the portal application 138 may utilize the subscription information indicated by the access card 160 associated with the media device 108 to filter, exclude, or otherwise remove media programs that are not authorized for viewing via the media device 108 to obtain a subset of the currently available broadcast media programs for which viewing is authorized. The server 102 and/or the portal application 138 may also utilize the user's preferences, personal information, viewing history, and/or other recommendation criteria stored in the database 120 in conjunction with the current location of the client 104 relative to the media device 108 to further filter, exclude, or otherwise remove media programs from consideration for recommendations. Thereafter, for each of the remaining broadcast media programs, the server 102 and/or the portal application 138 applies one or more algorithms using the user's preferences, personal information, viewing history, and/or other recommendation criteria along with the current location of the client 104 relative to the media device 108 to calculate or otherwise determine a metric indicative of the likely relevance or user interest for that respective media program. In this manner, the recommendation metric may be influenced, adjusted, or otherwise augmented based on the client location relative to the media device 108 and/or the distance between the client 104 and the media device 108.

Thereafter, the server 102 and/or the portal application 138 may select or otherwise identify the subset of the remaining broadcast media programs having the greatest values for their associated recommendation metrics as the recommended media programs for placeshifting to the client 104 and generate or otherwise provide a graphical user interface on the client 104 (e.g., within client application 105) that identifies or otherwise indicates the recommended media programs to the user. In this regard, the recommended media programs may be listed in descending order by their associated recommendation metric values. Thus, when the client location relative to the media device 108 results in the recommendation algorithm calculating a greater recommendation metric value for a particular media program, that media program is more highly recommended (or more likely to be recommended) when the client device 104 is at or near that location relative to the media device 108. In some embodiments, any recommended broadcast media programs that are unavailable (or likely to be unavailable) at the client 104, such as media programs that are not broadcast in the market area associated with the client location or media programs exclusive to the market area associated with the media device location, may be advanced in the order of recommended media programs. Thus, a particular broadcast media program may be more highly recommended, or alternatively not recommended, when the client 104 is at a particular location relative to the media device 108.

As described in greater detail below in the context of FIGS. 2-7, in exemplary embodiments, when the user of the client 104 accesses the portal application 138, the server 102 and/or portal application 138 obtains information indicative of the current geographic location of the client 104 and identifies or otherwise determines one or more media programs available at the media device 108 for presentation on the user's home display device 140 that are recommended for placeshifting to the client 104 based at least on part on the current geographic location of the client 104. In this regard, the current geographic location of the client 104 may influence the subset of recommended media programs that would otherwise be identified as most likely to be of interest to the user of the client 104 based on the user's preferences, personal information, viewing history, and the like. For example, depending on the embodiment, the server 102 and/or portal application 138 may identify, as a recommended media program, a media program that is relevant to the current geographic location of the client 104, a media program available at the media device 108 for presentation on the user's home display device 140 that is unavailable for viewing at the current geographic location of the client 104, a media program that the user is likely to be interested in based on the distance between the current geographic location of the client 104 and the home location associated with the media device 108, and/or the like. In this regard, the server 102 and/or portal application 138 may also obtain information indicative of the geographic location of the media device 108 for identifying or otherwise determining one or more recommended media programs based on the geographic location of the media device 108 relative to the current geographic location of the client 104. In one or more embodiments, location information indicative of the geographic location of the media device 108, such as, for example, a home address associated with the user, a network address associated with the media device 108, or the like, is stored or otherwise maintained in the database 120 in association with the user of the client 104 and/or the media device 108.

After identifying recommended media programs for the user of the client device 104 based at least in part on the client location, the server 102 and/or the portal application 138 presents or otherwise provides a graphical user interface on the client 104 (e.g., within client application 105) that indicates or otherwise identifies the recommended media programs for the user of the client 104. Thereafter, the user may manipulate the client device 104 to select or otherwise indicate a media program that the user would like to view from among the recommended media programs. In response, the client device 104 transmits or otherwise provides, to the server 102 via the network 106, a request to placeshift the selected media program from the media device 108 to the client device 104. Thereafter, the server 102 provides streaming instructions to the media device 108 that identify the selected media program to be placeshifted along with the client device 104 as the intended destination for the placeshifting. In response to the streaming instructions, the media device 108 initiates a placeshifting session for streaming the selected media program by establishing the peer-to-peer connection 180 with the client 104 over the network 106 and streaming the selected media program to the client 104 via the peer-to-peer connection 180. In alternative embodiments, the server 102 may provide streaming instructions to the client device 104 that identify the media device 108 (e.g., a network address or the like) as the source for the placeshifting, where the client device 104 initiates establishment of the peer-to-peer connection 180 with the media device 108 over the network 106. Thereafter, upon receiving indication of the selected media program, the media device 108 automatically streams or otherwise transfers the selected media program to the client 104 via the peer-to-peer connection 180.

Figure 2:
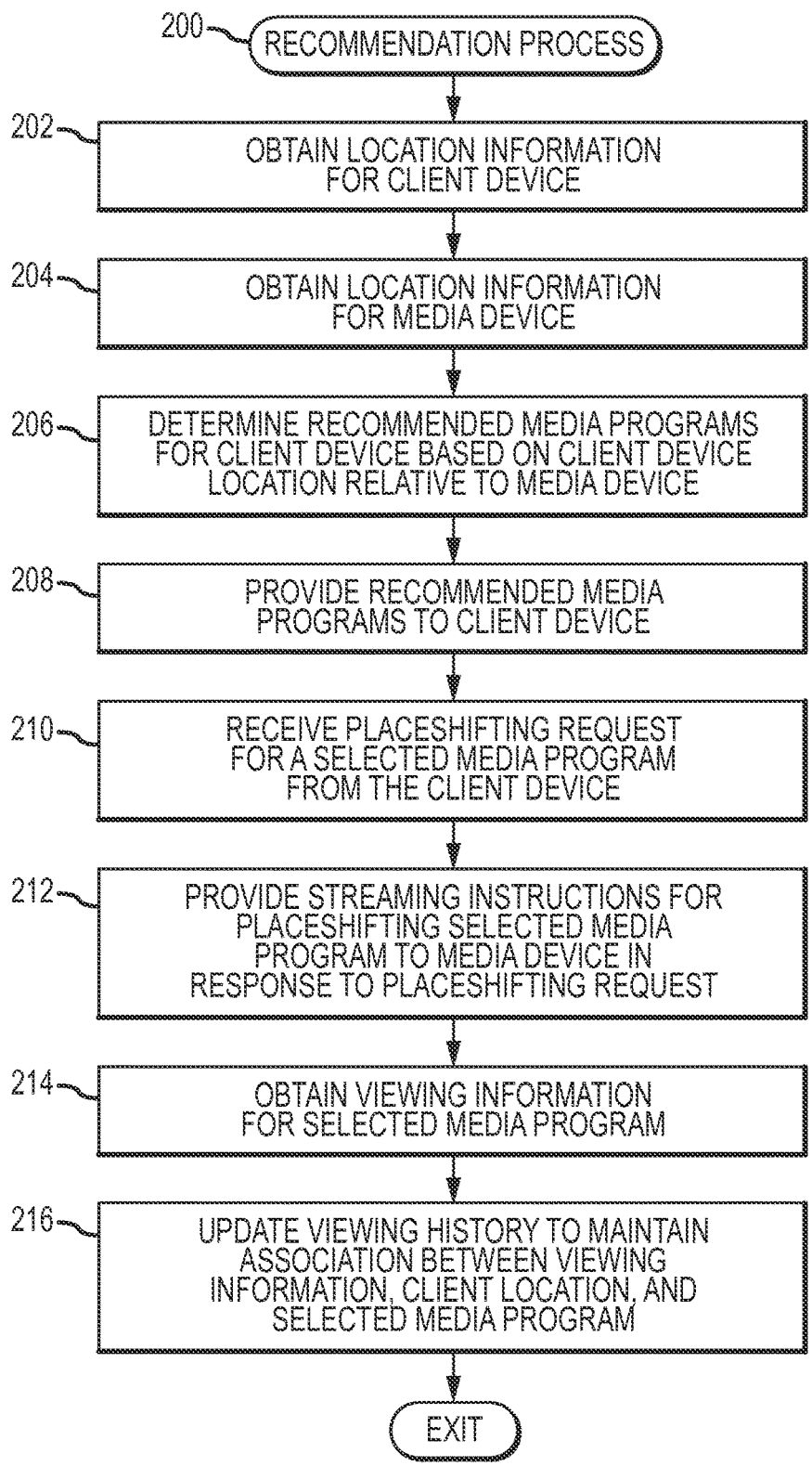
FIG. 2 is a flowchart of an exemplary recommendation process suitable for use with the placeshifting system of FIG. 1 in accordance with one or more embodiments.

FIG. 2 depicts an exemplary embodiment of a recommendation process 200 suitable for implementation by a server in a placeshifting system, such as the server 102 in the system 100 of FIG. 1, to recommend media programs for placeshifting in a manner that is influenced by a location of the destination device (e.g., client 104). The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the recommendation process 200 may be performed by different elements of the system 100, such as, for example, the server 102, the client device 104, the media device 108, and/or the database 120. It should be appreciated that the recommendation process 200 may include any number of additional or alternative tasks, the tasks need not be performed in the illustrated order and/or the tasks may be performed concurrently, and/or the recommendation process 200 may be incorporated into a more comprehensive procedure or process having additional functionality not described in detail herein. Moreover, one or more of the tasks shown and described in the context of FIG. 2 could be omitted from a practical embodiment of the recommendation process 200 as long as the intended overall functionality remains intact.

In exemplary embodiments, the recommendation process 200 begins by receiving or otherwise obtaining location information indicative of a geographic location of a destination device for the placeshifting (task 202). In one or more embodiments, the user of the client device 104 operates the client application 105 to communicate with the server 102 and/or the portal application 138 (e.g., by directing the client application 105 to a URL or other network address associated with the server 102 and/or the portal application 138). In some embodiments, the server 102 and/or the portal application 138 requests information indicative of the location of the client 104 from the client 104, while in alternative embodiments, the client 104 provides a request for the portal application 138 that includes information indicative of the location of the client 104. For example, if the client 104 includes a global positioning system (GPS) receiver or another positioning arrangement, the client 104 may transmit or otherwise provide the longitude, latitude, and/or other geographical coordinate information identified by the GPS receiver of the client 104 to the server 102 and/or the portal application 138. In other embodiments, the client 104 may calculate or otherwise determine its geographic location using triangulation, multilateration, or the like and transmit or otherwise provide the determined geographic location to the server 102 and/or the portal application 138. In yet other embodiments, the server 102 and/or the portal application 138 receives or otherwise obtains information identifying the location of the client 104 on the network 106 and identifies or otherwise determines the geographic location of the client 104 based on its location on the network 106. For example, the server 102 and/or the portal application 138 may identify an approximate geographic location of the client 104 based on its internet protocol (IP) address or another similar network address.

The illustrated recommendation process 200 continues by receiving or otherwise obtaining location information indicative of a geographic location of the source device for the placeshifting (task 204). In this regard, after the portal application 138 and/or the server 102 successfully authenticates the user of the client device 104, the server 102 and/or the portal application 138 identifies the media device 108 associated with the user and obtains information indicative of the location of the user's associated media device 108. For example, using user identifier for the user of the client device 104, the server 102 and/or the portal application 138 may access the database 120 to obtain identification information for the media device 108 associated with that user identifier, such as, for example, a unique identifier associated with the media device 108, an address of the media device 108 on the network 106, or the like. In one or more embodiments, the server 102 and/or the portal application 138 obtains the geographic location of the media device 108 from the database 120, for example, by identifying a home address associated with the user and/or the media device 108. In alternative embodiments, the server 102 and/or the portal application 138 identifies an approximate geographic location of the media device 108 based on its address on the network 106 (e.g., its IP address, or the like). In yet other embodiments, the server 102 and/or the portal application 138 requests information indicative of the location of the media device 108 from the media device 108. In such embodiments, the server 102 and/or the portal application 138 receives, from the media device 108, the longitude, latitude, and/or other geographical coordinate information that was identified by the GPS receiver of the media device 108 or otherwise determined by the media device 108 (e.g., using triangulation, multilateration, or the like).

After obtaining the geographic locations for both the source and destination devices, the recommendation process 200 continues by identifying or otherwise determining one or more recommended media programs for placeshifting to the destination device based at least in part on the geographic location of the destination device relative to the source device, and presenting or otherwise providing the recommended media program(s) to the user of the destination device (tasks 206, 208). In this regard, the server 102 and/or the portal application 138 utilizes the relationship between the geographic location of the client 104 relative to the media device 108 to influence or otherwise modify the recommended media programs for placeshifting to the client 104 that would otherwise be determined based on the user's viewing history, preferences, personal information, or the like. In this manner, one or more media programs may be more highly recommended or less highly recommended based on the current geographic location of the client 104, the geographic location of the media device 108, and/or the distance between the geographic location of the client 104 and the geographic location of the media device 108. After determining the media programs that are most likely to be relevant or interesting to the user of the client 104 based on the geographic locations of the client 104, the server 102 and/or the portal application 138 presents or otherwise provides a graphical representation of the recommended media programs on the client device 104 (e.g., within client application 105), thereby indicating the recommended media programs to the user.

As described above in the context of FIG. 1, in one or more exemplary embodiments, the server 102 accesses the electronic program guide 122 to obtain a listing of the broadcast media programs currently available from the broadcast source 112 and identifies the recommended media programs as a subset of the broadcast media programs provided by a broadcast source 112 that are available for viewing at the geographic location of the media device 108 via the receiver 142 and/or antenna 152 based on the user's viewing history, preferences, personal information, or the like in conjunction with the geographic location of the client device 104. For example, one or more of the recommended media programs may be realized as a broadcast media program available for viewing within a designated market area (DMA) encompassing the geographic location of the media device 108, where that broadcast media program is also unavailable via broadcast sources within the designated market area that encompasses the current geographic location of the client 104. Thus, if the client 104 is outside of the user's home market area associated with the media device 108, the recommended media programs may include one or more broadcast media programs that are available for viewing within the user's home market area but are unavailable for viewing within the market area where the client 104 is currently located (e.g., due to broadcast restrictions), such as, for example, local news programs associated with the user's home market area, local sports programs associated with the user's home market area, or broadcast media programs exclusively broadcast within the user's home market area.

In some embodiments, one or more of the recommended media programs are determined based on the distance between the geographic location of the client 104 and the geographic location of the media device 108. In this regard, as the distance between the client location and the user's home location varies, the recommended media programs determined by the server 102 and/or the portal application 138 may vary to reflect the distance between the client 104 and the media device 108. For example, the server 102 and/or the portal application 138 may determine that a first type, category, or genre of media programs (e.g., sitcoms, news programs, movies, or the like) is more likely to be relevant to the user when the client 104 is within a threshold distance of the media device location and less likely to be relevant when the distance between the client 104 and the media device 108 is greater than the threshold distance. At the same time, the server 102 and/or the portal application 138 may determine that a different type, category, or genre of media programs (e.g., dramas, miniseries, or the like) is less likely to be relevant when the client 104 is within the threshold distance of the media device 108 and more likely to be relevant when the distance between the client 104 and the media device 108 is greater than the threshold distance.

In exemplary embodiments, the server 102 and/or the portal application 138 also utilizes the subscription information associated with the user and/or the media device 108 (e.g., via the access card 160) to identify recommended media programs. For example, the server 102 and/or the portal application 138 may utilize the subscription information to filter or otherwise exclude, from the recommended media programs, broadcast media programs that are not authorized for viewing at the media device 108. Additionally, the server 102 and/or the portal application 138 may more highly recommend media programs exclusively available to subscribers with the user's subscription information, which are unlikely to be accessible or viewable at the current client location. For example, the server 102 and/or the portal application 138 may more highly recommend (e.g., by increasing the recommendation metric) media programs broadcast on premium or subscription-based broadcast channels to which the user and/or the media device 108 is authorized or subscribed.

Still referring to FIG. 2, with continued reference to FIG. 1, after providing indication of the recommended media programs to the destination device, the recommendation process 200 continues by receiving a placeshifting request for a selected media program from the destination device, and in response to the placeshifting request, transmitting or otherwise providing streaming instructions for the selected media program to the source device (tasks 210, 212). In exemplary embodiments, the user manipulates the client 104 to select or otherwise indicate, from among the list of recommended media programs identified by the server 102 and/or the portal application 138, one of the recommended media programs available for viewing at the media device 108 that the user would like to placeshift from the media device 108 to the client 104. For example, the user may select a recommended broadcast media program that is unavailable for viewing via over-the-air broadcast sources at the client location but available for viewing at the user's home location for placeshifting to the client 104.

In response to receiving the placeshifting request from the client 104, the server 102 and/or the portal application 138 transmits or otherwise provides, to the media device 108, streaming instructions that identify the selected media program (e.g., the broadcast channel, the program identifier, the title, or the like) for placeshifting and the requesting client 104 that is the intended destination for the selected media program. In this regard, the streaming instructions may include the address of the requesting client 104 on the network 106 along with other communications configuration information for use in establishing the peer-to-peer connection 180 with the client 104 over the network 106. In response to receiving the streaming instructions, the media device 108 automatically initiates a placeshifting session by attempting to establish the peer-to-peer connection 180 with the client 104 using the client network address and/or other communications configuration information received from the server 102. In alternative embodiments, in response to the placeshifting request, the server 102 and/or the portal application 138 may transmit or otherwise provide, to the client 104, the address of the user's associated media device 108 on the network 106 along with other communications configuration information for use by the client 104 in establishing the peer-to-peer connection 180 with the media device 108. In such embodiments, the client 104 initiates the placeshifting session by automatically attempting to establish the peer-to-peer connection 180 with the media device 108 and requesting the selected media program for streaming from the media device 108.

Once the peer-to-peer connection 180 is established, the media device 108 automatically begins streaming or otherwise transferring data corresponding to the selected media program to the client 104 via the peer-to-peer connection 180 for presentation by the media player 107. For example, for a live or real-time broadcast media program, the control module 146 may transcode or otherwise convert broadcast programming signals corresponding to the selected media program into a packetized format suitable for transmission over the network 106 and presentation by the media player 107 on the client 104.

In the illustrated embodiment of FIG. 2, the recommendation process 200 continues by receiving or otherwise obtaining viewing information for the placeshifted media program and updating the user's viewing history to store or otherwise maintain an association between the viewing information, the geographic location of the destination device, and the selected media program (tasks 214, 216). In this regard, when the peer-to-peer connection 180 is terminated or the presentation of the placeshifted media program is completed or otherwise stopped by media player 107, the server 102 and/or the portal application 138 may receive or otherwise obtain, either from the client 104 or the media device 108, the duration of viewing for the selected media program and/or other viewing parameters for the selected media program that are indicative of the entertainment value or relevance of the selected media program to the user. For example, if the user viewed the entirety or a large percentage of the selected media program, the server 102 and/or the portal application 138 may determine that the selected media program had a relatively higher entertainment value or relevance associated with that particular client location. In some embodiments, the portal application 138 may prompt the user for a rating or other feedback indicative of the relevance or entertainment value that the user would assign to the media program. Thereafter, the server 102 and/or the portal application 138 updates the user's viewing information in the database 120 to maintain an association between the selected media program, the viewing parameters for the selected media program, metadata for the selected media program (e.g., information identifying the type, category, genre, and/or the like for the selected media program), and the client geographic location associated with the viewing of the selected media program.

During subsequent iterations of the recommendation process 200, the relationship between the geographic location of the client 104 and the user's viewing information may influence subsequently recommended media programs. Thus, previously a viewed media program that was previously identified as having relatively higher entertainment value or relevance when the client 104 was at a particular geographic location may be used to recommend the same or similar media programs in the future when the client 104 is at or near that same geographic location. For example, if a user only viewed a small percentage of a particular media program at a particular geographic location, the server 102 and/or the portal application 138 may be less likely to recommend the same or similar media program during subsequent iterations of the recommendation process 200 when the client 104 is at or near that same geographic location relative to the media device 108. Thus, the server 102 and/or the portal application 138 may identify a correlation or relationship between the location of the client 104 relative to the media device 108 and the particular media programs (or the types, categories, or genres thereof) that are more or less likely to be relevant (or interesting) to the user when the client 104 is at or near that location relative to the media device 108. In this manner, the algorithms used to determine the recommended media programs may be adaptive to account for the relationship between the user's viewing behavior and the corresponding geographic locations of the client 104 relative to the media device 108.

Additionally, it should be noted that the recommendations may also be adaptive to account for the relationship between the geographic location of the client 104 relative to the media device 108 and the recommended media programs that are or are not selected by the user. For example, if the server 102 and/or the portal application 138 identifies or otherwise determines that a user selects a particular type (or category) of media program when the client 104 is at or near a particular geographic location or within a particular distance of the media device 108 (or a particular range of distances), the server 102 and/or the portal application 138 may store or otherwise maintain viewing information in the database 120 indicative of the frequency at which the user selects that particular type of media program, such that media programs of that type are more highly recommended (e.g., by having a higher recommendation metric value) when the client 104 is at or near that particular geographic location or within that particular distance of the media device 108. Conversely, if the server 102 and/or the portal application 138 identifies or otherwise determines that a user does not select media programs of another type (or category) when the client 104 is at or near that particular geographic location or within that particular distance of the media device 108, the server 102 and/or the portal application 138 may store or otherwise maintain information in the database 120 that results in media programs of that type being less likely to be recommended (e.g., by having a lower recommendation metric value) when the client 104 is at or near that particular geographic location or within that particular distance of the media device 108.

Figure 3:
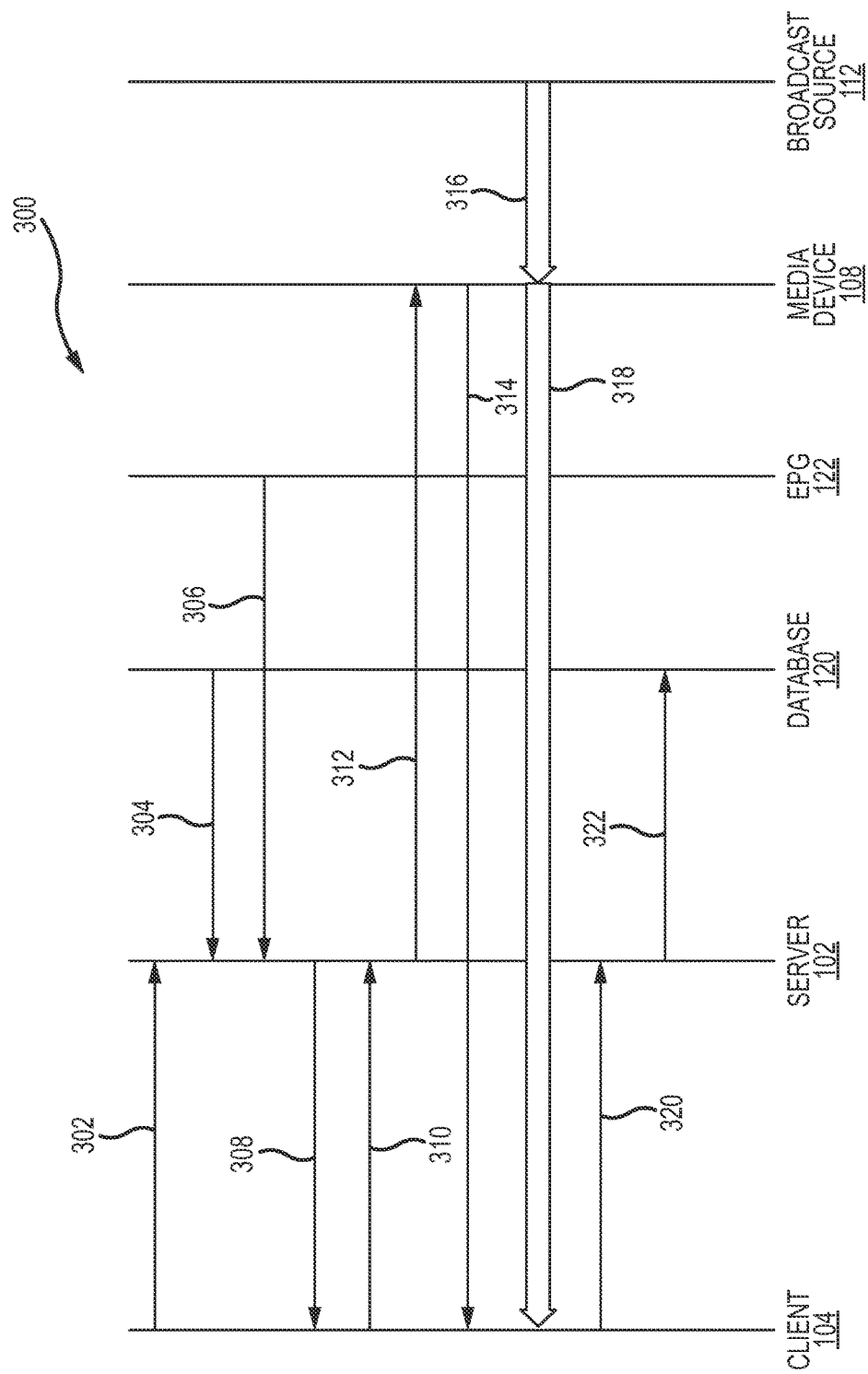
FIG. 3 is a diagram illustrating a sequence of communications within the placeshifting system of FIG. 1 in accordance with one exemplary embodiment of the recommendation process of FIG. 2.

FIG. 3 depicts an exemplary sequence 300 of communications within the system 100 of FIG. 1 in conjunction with the recommendation process 200 of FIG. 2 in accordance with one or more exemplary embodiments. The illustrated sequence 300 begins with the client 104 contacting the server 102 and the server 102 obtaining 302 location information indicative of a geographic location of the client 104. For example, the client 104 may transmit a request for the portal application 138 that includes the geographic location of the client 104 (e.g., GPS coordinates, a triangulated location, or the like) or other information that may be utilized by the server 102 to estimate or otherwise determine the geographic location of the client 104 (e.g., an address on the network 106). Alternatively, the server 102 may request the geographic location of the client 104 from the client 104 in response to the client 104 contacting the server 102. In exemplary embodiments, the server 102 also receives identification information (e.g., a user identifier, password, and/ or the like) for the user of the client 104 and/or identification information for the media device 108 associated with the user.

After authenticating the user, in the illustrated embodiment, the server 102 accesses the database 120 to obtain 304 location information indicative of a geographic location of the media device 108 along with the viewing history, user preferences, personal information, and/or other recommendation criteria associated with the user of the client device 104. For example, using the identification information associated with the user of the client 104, the server 102 may obtain street address information associated with the user for use as the geographic location of the media device 108. In alternative embodiments, the server 102 may obtain the network address of the media device 108 from the database 120 and contact the media device 108 via the network 106 to obtain the geographic location from the media device 108 (e.g., GPS coordinates from a GPS receiver of the media device 108). Additionally, the server 102 obtains the user's viewing history, user preferences, personal information, and/or other recommendation criteria from the database 120. In some embodiments, the subscriber information from the access card 160 may be stored or otherwise maintained in the database 120 in association with the user and/or the media device 108 and obtained by the server 102 along with the media device location and the user's recommendation criteria. In alternative embodiments, the server 102 may contact the media device 108 via the network 106 to obtain the subscriber information from the access card 160 from the media device 108.

In the illustrated embodiment, the server 102 obtains 306, from the program guide 122, a listing of the broadcast media programs currently available from the broadcast content source 112. Thereafter, the server 102 identifies or otherwise determines a subset of those broadcast media programs that are available for viewing at the media device 108 (e.g., on the user's home television 140) that are likely to be of interest or otherwise relevant to the user of the client 104 based on the user's viewing history, user preferences, personal information, and/or other recommendation criteria while also taking into account the geographic location of the client 104 relative to the media device 108. Using the subscriber information associated with the media device 108, the server 102 may filter, remove, or otherwise exclude broadcast media programs that are not authorized for viewing at the media device 108 from the listing of the currently available broadcast media programs, resulting in a listing of the current broadcast media programs available for viewing via the media device 108. Thereafter, the server 102 identifies a subset of the current broadcast media programs available for viewing via the media device 108 that is most likely to be of interest to the user of the client 104. As described in greater detail below in the context of FIGS. 4-5, the geographic locations of the client 104 and the media device 108 are factored into the recommendation determination, such that the recommended media programs are influenced by the client location relative to the media device location.

After determining recommended media programs for the user, the server 102 presents or otherwise provides 308 an indication of the recommended media programs on the client device 104. For example, the portal application 138 may generate or otherwise provide one or more graphical representations that identify the broadcast media programs available from the broadcast source 112 that are recommended for the user of the client 104 (e.g., a list comprised of thumbnail images associated with the recommended broadcast media programs). Thereafter, a user may manipulate the client 104 to select or otherwise indicate a broadcast media program from among the recommended broadcast media programs that the user would like to view. In the illustrated embodiment, the server 102 receives 310 a placeshifting request from the client 104 that identifies the selected broadcast media program, and in response, the server 102 transmits or otherwise provides 312 streaming instructions to the media device 108 that identify the client 104 as the destination device for the placeshifting session along with the selected broadcast media program for the placeshifting session. In response to the streaming instructions, the media device 108 automatically initiates 314 the peer-to-peer connection 180 over the network 106 with the client 104. After establishing the peer-to-peer connection 180, the media device 108 receives 316 the selected broadcast media program from the broadcast source 112 (e.g., by tuning the receiver 142 to a broadcast channel identified by the streaming instructions) and automatically transfers or streams 318 the selected broadcast media program to the media player 107 on the client 104.

In the illustrated embodiment, when the user of the client 104 completes viewing the selected media program or otherwise manipulates the media player 107 to terminate viewing the selected media program, the media player 107 and/or the client application 105 may transmit or otherwise provide viewing parameters for the selected media program that indicate how relevant the selected media program was to the user (e.g., the duration of viewing for the selected media program relative to the total runtime, or the like). In other embodiments, the media player 107 and/or the client application 105 may prompt the user of the client 104 for feedback regarding the selected media program's relevance or interest to the user, and transmit or otherwise provide the user feedback to the server 102 in addition to and/or in lieu of the viewing parameters for the selected media program. In response to receiving 320 viewing parameters and/or user feedback indicative of the entertainment value or relevance of the selected media program from the client 104, the server 102 updates 322 the database 120 to store or otherwise maintain the viewing parameters and/or user feedback in association with the selected media program. Additionally, the server 102 stores the geographic location of the client 104 in association with the selected media program, the viewing parameters, and/or the user feedback in the database 120.

As described above, the server 102 may identify a relationship or correlation between the geographic location of the client 104 relative to the media device 108 and the type of media programs that more or less relevant to the user based on the client location, which, in turn, may influence future recommended media programs identified by the server 102. For example, when the viewing parameters, and/or user feedback indicate a certain type (or category) of media programs are more relevant to the user when the client 104 is a particular distance (or within a particular range of distances) relative to the media device 108, the server 102 may more highly recommend broadcast media programs of that type in the future when the client 104 is at or near that particular distance from the media device 108. Conversely, when the viewing parameters, and/or user feedback indicate a certain type of media program is less relevant to the user when the client 104 is a particular geographic location relative to the media device 108, the server 102 may stop recommending broadcast media programs of that type in the future when the client 104 is at that particular geographic location relative to the media device 108.

Figure 4:
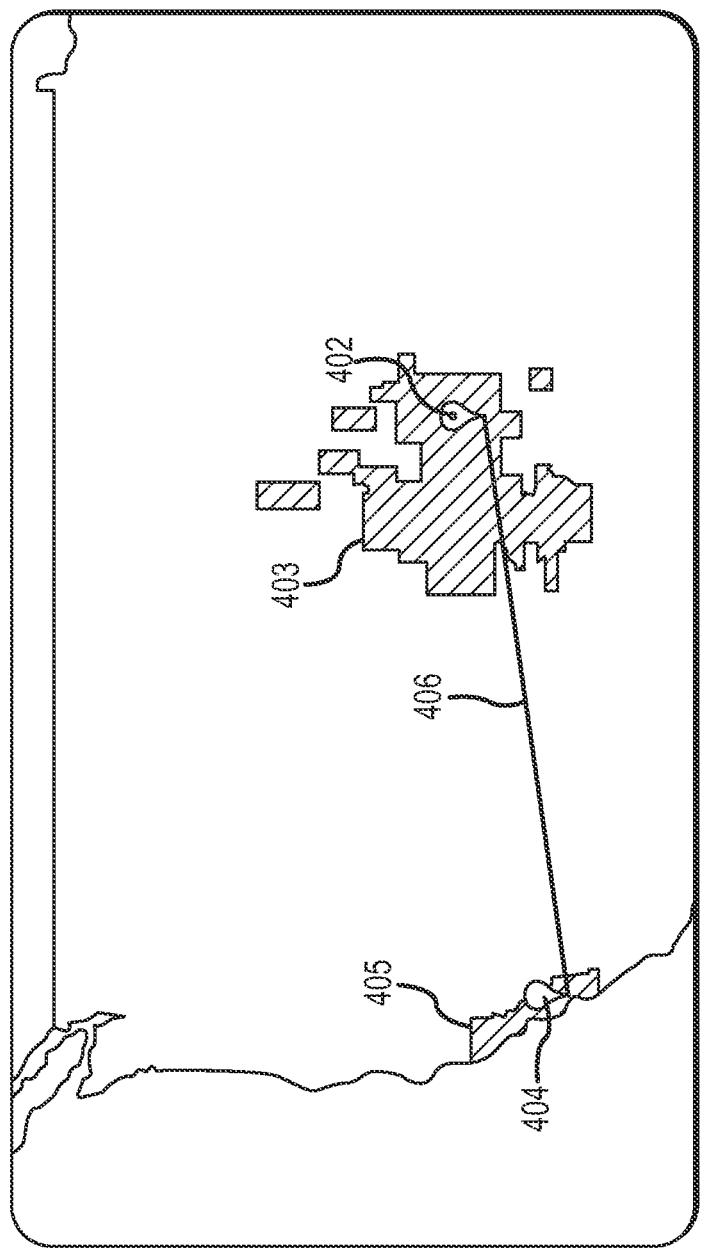
FIG. 4 depicts one exemplary scenario where the destination device for placeshifting is outside of a designated market area associated with the source device.

FIG. 4 illustrates one example scenario where the client 104 is outside a designated market area associated with the media device 108. In this regard, the home geographic location 402 of the media device 108 may reside within the designated market area 403 for Denver, Colo., while the geographic location 404 of the client 104 is within the designated market area 405 for San Francisco, Calif. In one or more embodiments, when the client geographic location 404 is outside the designated market area associated with the media device location 402, the server 102 and/or portal application 138 identifies broadcast media programs that are available for viewing within the designated market area for the media device 108 and/or unavailable for viewing within the current market area for the client 104 as recommended media programs. For example, the server 102 and/or portal application 138 may identify broadcast media programs that are exclusively available within the user's home designated market area 403 (e.g., Denver news programs, Denver sports programs, and/or other local programs broadcast within the Denver market area) as recommended broadcast media programs for viewing at the client 104 when the client location 404 is outside of the user's home designated market area encompassing the media device location. In this regard, the recommended broadcast media programs may include broadcast media programs that are unavailable for viewing within the current market area 405 for the client 104 due to various broadcast restrictions or other regulations.

In other embodiments, the server 102 and/or the portal application 138 identifies recommended broadcast media programs for the client 104 based on the distance 406 between the client location 404 and the media device location 402. In this regard, based on the user's viewing history in the database 120, the server 102 and/or portal application 138 may identify or otherwise determine that certain types or categories of media programs are more relevant to the user of the client 104 when the distance 406 is within a particular range of distances or otherwise exceeds a threshold value. For example, the server 102 and/or portal application 138 may determine that the user of the client 104 is more likely to be interested in viewing travel-related broadcast media programs when the distance between the client 104 and the media device 108 exceeds a threshold distance, and accordingly, more highly recommend current broadcast media programs of that genre when the distance 406 between the client location 404 and the media device location 402 exceeds that threshold. Conversely, the server 102 and/or portal application 138 may determine that the user of the client 104 is less likely to be interested in viewing reality television programming when the distance between the client 104 and the media device 108 exceeds the threshold distance, and accordingly, fail to recommend or otherwise stop recommending currently broadcast reality television media programs when the distance 406 between the client location 404 and the media device location 402 exceeds that threshold. Thus, certain genres of programming may be more highly recommended by the server 102 and/or portal application 138 when the distance 406 exceeds a threshold, while other genres of programming that would otherwise be recommended when the distance between the client 104 and media device 108 is less than the threshold are not recommended by the server 102 and/or portal application 138 when the distance 406 exceeds the threshold.

Figure 5:
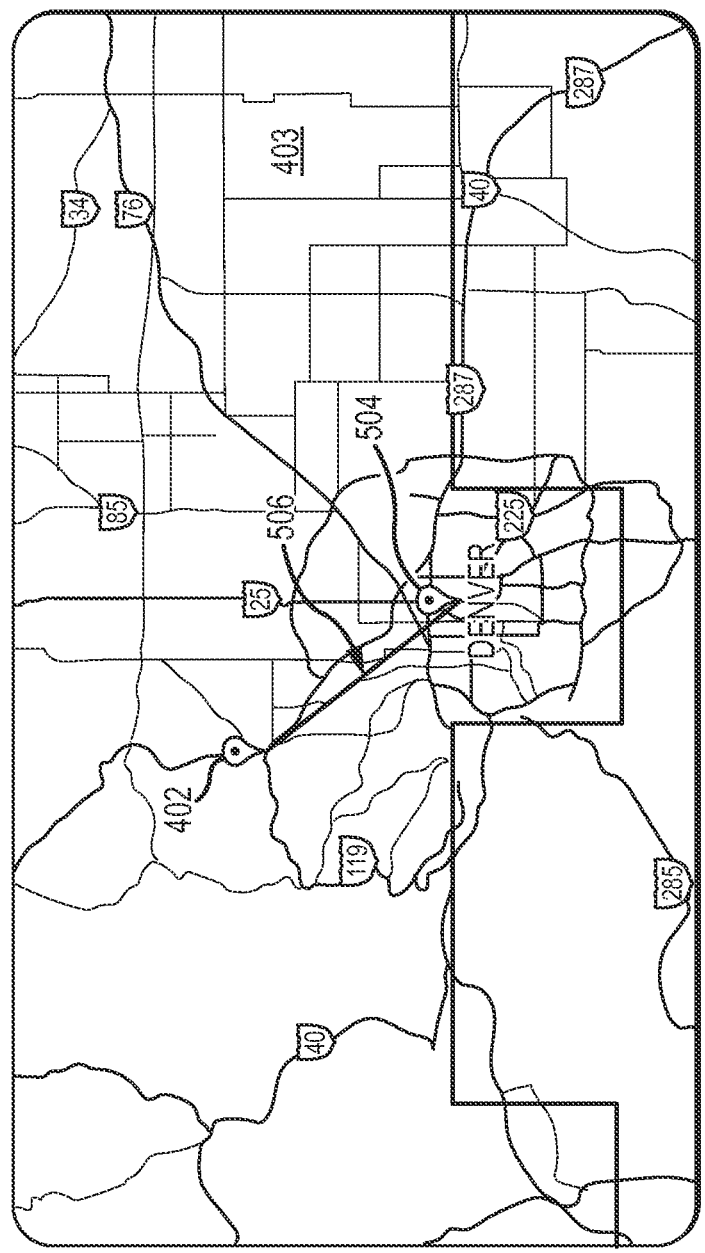
FIG. 5 depicts another exemplary scenario where the destination device for placeshifting is within a designated market area associated with the source device.

Turning now to FIG. 5, in exemplary embodiments, the recommended media programs identified by the server 102 and/or the portal application 138 vary depending on the distance 506 between the client geographic location 504 and the home geographic location 402 of the media device 108.

In this regard, when the geographic location 504 of the client 104 is within the same designated market area 403 as the media device 108, the recommended broadcast media programs may be different than those that would be recommended when the client 104 is outside of the home designated market area associated with the media device 108, as described above in the context of FIG. 4. For example, the server 102 and/or portal application 138 may not identify broadcast media programs that are exclusively available within the user's home designated market area as recommended media programs when the client location 504 is within the home designated market area, because the user could presumably view those through another device nearby (e.g., a television at or near the client location 504) if the user were interested in those programs. Rather, the server 102 and/or portal application 138 may identify broadcast media programs that are authorized for viewing via the media device 108 based on the user's subscriber information on the access card 160 that are less likely to be authorized for viewing on another device at or near the client location 504. For example, if the user's subscriptions allow the user to access premium channels or other subscription-based programming that are unauthorized or otherwise unavailable via over-the-air broadcasts within the user's home designated market area, the server 102 and/or the portal application 138 may identify one or more of those broadcast media programs that are available at the media device 108 based on the user's subscription (e.g., a media program currently broadcast on a premium channel) as recommended broadcast media programs when the client location 504 is within the home designated market area associated with the media device 108.

In a similar manner as described above in the context of FIG. 4, the server 102 and/or portal application 138 may also determine recommended broadcast media programs for the client 104 based on the distance 506 between the client location 504 and the media device location 402. Based on the user's viewing history in the database 120, the server 102 and/or portal application 138 may identify or otherwise determine that certain types or categories of media programs are more relevant to the user of the client 104 when the distance 506 is within a particular range of distances or otherwise less than a threshold value. For example, the server 102 and/or portal application 138 may determine that the user of the client 104 is more likely to be interested in viewing news programming when the distance between the client 104 and the media device 108 is less than a threshold distance, and accordingly, more highly recommend current broadcast news media programs when the distance 506 between the client location 504 and the media device location 402 is less than that threshold. In this regard, one or more factors in the recommendation algorithm may be adjusted or otherwise modified to increase the recommendation metric value for news media programs when the distance 506 between the client location 504 and the media device location 402 is less than that threshold distance. Conversely, the server 102 and/or portal application 138 may determine that the user of the client 104 is less likely to be interested in viewing travel-related programming when the distance between the client 104 and the media device 108 is less than the threshold distance, and accordingly, stop recommending currently broadcast travel-related media programs when the distance 506 between the client location 504 and the media device location 402 is less than that threshold (e.g., by adjusting or modifying one or more factors in the recommendation algorithm to decrease the recommendation metric value for travel-related media programs). Thus, certain types, categories, or genres of programming may be more highly recommended by the server 102 and/or portal application 138 when the client 104 is closer to the media device 108, while other genres of programming that would otherwise be recommended when the client 104 is further from the media device 108 are not recommended by the server 102 and/or portal application 138. In other words, one or more of the recommended media programs identified by the server 102 and/or the portal application 138 when determining recommendations based on the distance 406 in FIG. 4 may not be recommended by the server 102 and/or the portal application 138 when determining recommendations based on the distance 506 in FIG. 5, and vice versa.

FIGS. 6-7 depict exemplary graphical user interfaces 600, 700 that may be generated or otherwise provided by the server 102 and/or the portal application 138 and presented on the client 104 (e.g., within client application 105) to indicate or otherwise identify recommended media programs for the user of the client device 104 based on the distance between the client 104 and the user's associated media device 108. For example, referring to FIG. 6 with reference to FIG. 4, when the distance 406 between the client location 404 and the home geographic location 402 for the media device 108 is greater than a threshold and/or the client 104 is outside of the designated market area associated with the home geographic location 402, the server 102 and/or the portal application 138 may identify a currently broadcast sports media program that is local and/or exclusive to the designated market area 403 associated with the home geographic location 402 as a recommended broadcast media program and generate, render, or otherwise provide a graphical representation 602 (e.g., a selectable thumbnail image or other selectable graphical user interface element) of that currently broadcast sports media program in the graphical user interface 600. Similarly, the server 102 and/or the portal application 138 may identify a currently broadcast news media program that is local and/or exclusive to the designated market area 403 associated with the home geographic location 402 as another recommended broadcast media program and generate, render, or otherwise provide a graphical representation 604 of that currently broadcast news media program in the graphical user interface 600. Additionally, based on the distance 406 being greater than a threshold distance away from the home geographic location 402 for the media device 108, the server 102 and/or the portal application 138 may identify a currently broadcast travel-related media program as another recommended broadcast media program and generate, render, or otherwise provide a graphical representation 606 of that currently broadcast travel-related media program in the graphical user interface 600. In this regard, in some embodiments, the server 102 and/or the portal application 138 may utilize the current geographic location 404 of the client 104 to select or otherwise identify, from among all of the currently broadcast travel-related media programs, a currently broadcast travel-related media program that is most likely to be relevant to the client location 404 (e.g., a travel-related media program that pertains to California).

As described above, the user's viewing history associated with the client location 404, locations within a threshold distance of the client location 404, and/or the market area 405 encompassing the client location 404 may be utilized to identify recommended media programs when the client 104 is subsequently at or within a threshold distance of client location 404 or otherwise within the market area 405 encompassing the client location 404. For example, if the viewing history associated with the user indicates that the user has previously selected and viewed placeshifted broadcast news media programs associated with the media device market area 403 when the user was within market area 405, and the viewing parameters associated with those previously placeshifted broadcast news media programs indicates they are highly relevant when the user is within the market area 405 (e.g., the user watched a high percentage of those media programs when within the market area 405, the user selects those types of media programs when within the market area 405, or the like), the server 102 and/or the portal application 138 may highly recommend broadcast news media programs associated with the media device market area 403 (e.g., media program 604) when the client location 404 is at or within a threshold distance of the market area 405 and/or the previous client locations associated with the previously placeshifted broadcast news media programs.

For example, the user's viewing history in the database 120 may include previous viewing location information and viewing parameters associated with a plurality of previously viewed media programs that the user has placeshifted. The server 102 and/or the portal application 138 may filter the user's viewing history to identify one or more previously viewed media programs having associated previous viewing location information that corresponds to locations at or within a threshold distance of the client location 404 (e.g., any media programs previously placeshifted by the user while in the San Francisco market area 405). After using the relationship between the previous viewing location information associated with the previously viewed media programs and the location of the destination device to identify a subset of the user's viewing history most likely to be relevant to determining recommendations for the current client location 404, the server 102 and/or the portal application 138 may further identify or otherwise determine a broadcast media program is relevant based on the viewing parameters associated with those previously viewed media programs. For example, if the server 102 and/or the portal application 138 filters the user's viewing history to identify previously viewed broadcast news media programs available within the Denver market area 403 that have associated viewing location information that corresponds to or is otherwise within the San Francisco market area 405 (or alternatively, within a threshold distance of client location 404) and the viewing parameters indicate those previously viewed broadcast news media programs for the Denver market area 403 were highly relevant or interesting to the user while in the San Francisco market area 405, the server 102 and/or the portal application 138 may identify and recommend a Denver news media program 604 when the client location 404 is within the San Francisco market area 405.

Referring now to FIG. 7 with reference to FIG. 5, when the distance 506 between the client location 504 and the home geographic location 402 for the media device 108 is less than the threshold and/or the client 104 is within the designated market area associated with the home geographic location 402, the server 102 and/or the portal application 138 may identify currently broadcast media programs that are exclusive to subscribers of one or more particular premium channels to which the user and/or the media device 108 is authorized (e.g., via access card 160) as recommended broadcast media programs and generate, render, or otherwise provide graphical representations 702, 704 of those currently broadcast premium media programs within the graphical user interface 700.

In the illustrated embodiment, the server 102 and/or the portal application 138 also identifies currently broadcast travel-related media program that is likely to be relevant to the user of the client device 104 based on the user's viewing history and/or a previous client location 404. For example, if the user of the client 104 previously selected the graphical representation 606 of a travel-related broadcast media program for placeshifting from the media device 108 to the client 104 and the viewing parameters for the streaming of the travel-related broadcast media program to the client 104 indicates that the travel-related broadcast media program was highly relevant to the user, the server 102 and/or the portal application 138 may subsequently select or otherwise identify a currently broadcast travel-related media program that is related to the previously viewed travel-related broadcast media program 606 or otherwise relevant to the previous client location 404 as a recommended media program and generate, render, or otherwise provide a graphical representation 706 of that currently broadcast travel-related media program within the graphical user interface 700. Thus, the server 102 and/or the portal application 138 may identify that the user is likely to be interested in viewing media programs associated with or otherwise relevant to a previous client location 404, and therefore, recommend media programs related to that previous client location 404 even though the client 104 may no longer be located at that previous client location 404.

Referring to FIGS. 4-7, it should be noted that the user's viewing history associated with various previous client locations may be utilized to recommend media programs when the current client location is at or within a threshold distance of those client locations. For example, if the user's viewing history indicates broadcast news media programs are more highly relevant when the client device 104 is within market area 405 and recorded media programs and/or premium broadcast media programs are more highly relevant when the client device 104 is within market area 403, as the current client location varies, the recommended media programs may also vary. In this regard, when the current client location is outside of the media device market area 403 but closer to the media device market area 403 than it is to a previous client location 404 and/or client market area 405, the server 102 and/or the portal application 138 may more highly recommend recorded media programs on the media device 108 and/or premium broadcast media programs for placeshifting. As the current client location increases relative to the media device market area 403 or the distance between the current client location and the previous client location 404 and/or client market area 405 is less than the distance between the current client location and the media device location 402 and/or market area 403, the server 102 and/or the portal application 138 may increasingly recommend broadcast news media programs associated with the media device market area 403 and decreasingly recommend recorded media programs and/or premium broadcast media programs. Thus, the user's viewing history associated with various previous client locations and the relationship between the user's viewing history and those client locations relative to the media device 108 may be effectively interpolated and/or extrapolated to determine which media programs are more or less likely to be relevant to the user at new client locations and/or new market areas that do not have any viewing history associated therewith. In other words, the user's viewing history for the user associated with locations within a threshold distance or otherwise proximate a new client location may be used to identify recommended media programs for that new client location.

To briefly summarize, by virtue of the subject matter described herein, media programs recommended for a placeshifting session over a network may be determined in a manner that accounts for the current and/or previous geographic location of the user and/or the client device relative to the media device, along with the user's viewing behavior associated with the current and/or previous geographic location of the user and/or the client device, thereby improving the quality of the recommendations. For example, media programs that are unavailable and/or unauthorized for viewing at the current geographic location associated with the user and/or the client device may be identified or otherwise determined as likely to be more relevant to the user based on their likely (if not actual) unavailability at the current geographic location and suggested or otherwise provided to the user for placeshifting to the current geographic location. In other embodiments, the user's viewing behavior with respect to media programs that were previously placeshifted when the user and/or the client device was at or near a particular location (or within a particular range of distances from the media device) may be utilized to augment future recommendations when the client device is subsequently at or near that particular location. Furthermore, the previous geographic location(s) of the user and/or the client device may be used to identify media programs which may or may not be relevant to the user based on the user's previous presence at a particular geographic location. In this manner, the recommended media programs will vary based on the current geographic location of the user and/or the client device relative to the media device.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to placeshifting, streaming media, networking, recommendation algorithms or other techniques for determining relevant content, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of hardware, software, and/or firmware components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method of placeshifting a media program from a media device to a destination device over a network, the method comprising:

obtaining, by a server coupled to the destination device over the network, a first geographic location associated with the destination device;

obtaining, by the server, a second geographic location associated with the media device associated with a user of the destination device, the media device including a receiver interface for receiving a plurality of broadcast media programs;

obtaining, by the server, a viewing history for the user of the destination device, the viewing history including previous viewing location information and viewing parameters associated with each of one or more previously viewed media programs;

filtering, by the server, the viewing history to identify a subset of the viewing history including one or more previously viewed media programs having associated previous viewing geographic location information that corresponds to locations at or within a threshold distance of the first geographic location of the destination device;

identifying, by the server, a type of media content as being relevant to the user at the first geographic location of the destination device based on the viewing parameters associated with each previously viewed media program of the subset of the viewing history, resulting in a relevant type of media content;

adjusting, by the server, one or more factors in a recommendation algorithm to increase a recommendation metric value for the relevant type of media content based on a distance between the first geographic location and the second geographic location;

identifying, by the server, one or more of the plurality of broadcast media programs of the relevant type that are available at the media device as one or more recommended media programs available for streaming from the media device using the recommendation algorithm with the adjusted one or more factors; and providing, by the server, indication of the one or more recommended media programs to the destination device via the network.

2. The method of claim 1, further comprising:

receiving, by the server, indication of a selected media program of the one or more recommended media programs from the destination device;

providing, by the server, streaming instructions for the selected media program to the media device, wherein the media device initiates a placeshifting session for streaming the selected media program to the destination device over the network in response to the streaming instructions.

3. The method of claim 1, further comprising determining the distance between the first geographic location and the second geographic location, wherein identifying the one or more recommended media programs comprises determining the one or more recommended media programs based at least in part on the distance.

4. The method of claim 3, wherein identifying the one or more recommended media programs comprises:
identifying the type of media content as being of interest to the user of the destination device based on the distance.

5. The method of claim 1, further comprising identifying a market area associated with the first geographic location of the destination device, wherein:
identifying the one or more recommended media programs comprises identifying the one or more broadcast media programs of the relevant type that are unavailable within the market area; and
providing the indication of the one or more recommended media programs to the destination device comprises identifying the one or more broadcast media programs unavailable within the market area on the destination device as the one or more recommended media programs.

6. The method of claim 1, further comprising identifying a home market area associated with the media device, wherein:
identifying the one or more recommended media programs comprises identifying the one or more broadcast media programs of the relevant type that are unavailable outside of the home market area; and
providing the indication of the one or more recommended media programs to the destination device comprises identifying the one or more broadcast media programs unavailable outside of the home market area on the destination device.

7. The method of claim 1, further comprising obtaining the plurality of broadcast media programs capable of being received by the media device via the receiver interface associated with the media device, wherein the one or more recommended media programs comprise a subset of the plurality of broadcast media programs.

8. The method of claim 7, further comprising:
receiving, by the server from the destination device, indication of a selected broadcast media program from among the subset of the plurality of broadcast media programs;
providing, by the server, streaming instructions for the selected broadcast media program to the media device, wherein the media device initiates a placeshifting session for streaming the selected broadcast media program from the receiver interface to the destination device over the network in response to the streaming instructions.

9. The method of claim 7, further comprising identifying a market area associated with the destination device based on the first geographic location, wherein the one or more recommended media programs include the one or more broadcast media programs of the relevant type that are unavailable within the market area.

10. The method of claim 7, further comprising identifying a home market area associated with the media device, wherein the one or more recommended media programs include the one or more broadcast media programs of the relevant type that are unavailable outside of the home market area.

11. The method of claim 1, wherein:
the viewing history includes previous viewing geographic location information and viewing parameters associated with each of one or more previously viewed media programs; and
identifying the one or more recommended media programs comprises determining a broadcast program is relevant based on the viewing parameters associated with the one or more previously viewed media programs and a relationship between the previous viewing geographic location information associated with the one or more previously viewed media programs and the first geographic location of the destination device.

12. The method of claim 11, the viewing history comprising a plurality of previously viewed media programs, wherein the method further comprises identifying the one or more previously viewed media programs from among the plurality based on the previous viewing geographic location information associated with the one or more previously viewed media programs being at or within a threshold distance of the first geographic location of the destination device.

13. A non-transitory computer-readable medium having computer-executable instructions stored thereon that, when executed by a processing system of the server, cause the processing system to perform the method of claim 1.

14. A system comprising:
a set-top box coupled to a network, the set-top box including a receiver interface capable of receiving a plurality of broadcast media programs; and
a server coupled to the network to:
obtain a first geographic location associated with a client device coupled to the network;
obtain a second geographic location associated with the set-top box associated with a user of the client device;
obtain a viewing history for the user of the client device that includes previous viewing geographic location information and viewing parameters associated with each of one or more previously viewed media programs;
filter the viewing history to identify a subset of the viewing history including one or more of the previously viewed media programs having associated previous viewing geographic location information that corresponds to locations at or within a threshold distance of the first geographic location of the client device;
identify a type of media content as being relevant to the user at the geographic location of the client device based on the viewing parameters associated with each previously viewed media program of the subset of the viewing history, resulting in a relevant type of media content;
adjust one or more factors in a recommendation algorithm to increase a recommendation metric value for the relevant type of media content based on a distance between the first geographic location and the second geographic location;
determine one or more recommended media programs comprising a subset of the plurality of broadcast media programs available for streaming from the set-top box to the client device over the network based at least in part on the viewing location information associated with each of the one or more previously viewed media programs in a manner that is influenced by the first geographic location of the client device relative to the second geographic location of the set-top box using the recommendation algorithm with the adjusted one or more factors, wherein the one or more recommended media programs comprise one or more broadcast media programs of a plurality of broadcast media programs of the relevant type that are available at the set-top box; and provide indication of the one or more recommended media programs to the client device via the network.

15. The system of claim 14, the server receiving indication of a selected media program of the one or more recommended media programs from the client device and providing streaming instructions for the selected media program to the set-top box, wherein the set-top box initiates a placeshifting session for streaming the selected media program from the receiver interface to the client device over the network in response to the streaming instructions.

16. A method of placeshifting a media program from a set-top box to a client device over a network, the method comprising:
   identifying a client geographic location of the client device;
   identifying a home geographic location of the set-top box associated with a user of the client device, the set-top box including a receiver interface capable of receiving a plurality of broadcast media programs;
   obtaining, by a server coupled to the network, a viewing history for the user of the client device, the viewing history including previous viewing geographic location information and viewing parameters associated with each of one or more previously viewed media programs;
   determining, by the server, one or more recommended broadcast media programs from among a plurality of broadcast media programs available at the set-top box based at least in part on the client geographic location relative to the home geographic location and the previous viewing geographic location information associated with each of the one or more previously viewed media programs, wherein determining the one or more recommended broadcast media programs comprises:
      filtering, by the server, the viewing history to identify a subset of the viewing history including one or more previously viewed media programs having associated previous viewing geographic location information that corresponds to locations at or within a threshold distance of client geographic location; and
      identifying, by the server, a type of media content as being relevant to the user of the client device based on the viewing parameters associated with each previously viewed media program of the subset of the viewing history, resulting in a relevant type of media content;
   adjusting, by the server, one or more factors in a recommendation algorithm to increase a recommendation metric value for the relevant type of media content based on a distance between the client geographic location and the home geographic location; and
   identifying one or more broadcast media programs of the relevant type from among the plurality of broadcast media programs as the one or more recommended broadcast media programs using the recommendation algorithm with the adjusted one or more factors;
   providing, by the server, indication of the one or more recommended broadcast media programs to the client device via the network;
   receiving, by the server, indication of a selected broadcast media program of the one or more recommended broadcast media programs from the client device; and
   providing, by the server, streaming instructions for the selected broadcast media program to the set-top box, wherein the set-top box initiates a placeshifting session for streaming the selected broadcast media program from the set-top box to the client device over the network in response to the streaming instructions.

17. The method of claim 1, the media device comprising a set-top box and the destination device comprising a mobile device, wherein:
   obtaining the first geographic location comprises the server receiving the first geographic location from the mobile device; and
   obtaining the second geographic location comprises obtaining a street address associated with a user of the mobile device.

18. The method of claim 1, wherein the previous viewing geographic location information comprises a geographic location of the destination device at a time of placeshifting a respective previously viewed media program of the one or more previously viewed media programs.

* * * * *